United States Patent Office 3,146,209
Patented Aug. 25, 1964

3,146,209
GEL OXIDE-ALUMINOHYDRIDE COMPOSITIONS
Joseph J. Byrne, Watertown, Mass., and Stephen F. Adler, Stamford, Conn., assignors to American Cyanamid Company, New York, N.Y., a corporation of Maine
No Drawing. Filed Nov. 3, 1960, Ser. No. 66,923
8 Claims. (Cl. 252—188)

This invention relates to novel hydride compositions or hydride ion sources.

In general terms, a hydride may be described as a hydrogen-containing compound in which the hydrogen reacts chemically as an anionic specie.

We shall now define, as a general class of compositions of matter, "metallohydride ion sources" which are those materials which contain (1) a metal and (2) hydrogen which reacts chemically as a hydride ion as, for example, to react with protons to form hydrogen gas. Examples of such metal hydride ion sources include lithium aluminohydride, sodium borohydride, aluminum hydride, sodium hydride and numerous other metal hydrides, these having many uses, for example, as reducing agents, drying agents, dehalogenation agents, desulfurization agents, and the like. It is with these metallohydride ion sources and, in particular, with aluminohydride ion sources that this invention concerns itself. As is well known, hydrides and, in particular, metal hydrides and metal metallohydrides of the prior art react readily with water to yield hydrogen and the metal oxide or, as the case may be, a plurality of metal oxides. As a matter of fact, many hydrides (lithium aluminohydride, for example) react easily with atmospheric moisture. This propensity of metal hydrides to react readily with water is a problem of considerable magnitude to those concerned with storing and employing these hydrides as reducing agents and for other purposes in industrial chemical processes. This reaction with moisture is of sufficient rapidity and, in some instances, violence as to normally require special containers and/or storage conditions.

Additionally, the metal hydrides, as for example, lithium aluminohydride, when employed in chemical processes as reducing agents, frequently result in the introduction into the reaction mixture of by-products, as for example, the metal oxides and/or the metal hydroxides of the metal hydrides, which by-products sometimes contaminate the final product.

Further, the physical form of these hydrides is such that they may not be employed for many applications where the chemical properties of the hydride would or could be important.

It is one object of the present invention to provide a novel, solid metal hydride ion source which is only minimally reactive toward atmospheric moisture, whereby a relatively stable source of hydride ion is obtained and the hazards normally attendant to exposing metal hydrides and metal metallohydrides to atmospheric moisture are substantially reduced.

A further object of the present invention is to provide a metal hydride ion source which may be readily removed from reaction mixtures and which does not in practice significantly contaminate the reaction mixture or end products formed therein with soluble intermediates or by-products.

A special object of the present invention is to provide a metal hydride ion source capable of use in catalytic applications as, for example, in catalyst materials in which both the catalytic properties of the composition and the hydride ion properties of the composition may be employed with advantage.

These and other objects and advantages of the present invention will become more apparent from the detailed description thereof set forth hereinbelow.

In accordance with the present invention, novel metal hydride ion sources are provided which comprise gel oxides containing aluminohydride groups, i.e., presumably groups containing hydridic hydrogen bonded to aluminum, bound to the surfaces thereof.

The gel oxides suitable for use in preparing the solid aluminohydride ion sources of this invention may be any of the metal oxide gels that are well known in the catalytic art useful as either catalyst base materials or as promoting materials in catalyst compositions. Additionally, the oxide gel bases may be plural oxide gel bases, i.e., they may contain mixtures or compounds of two or more of such oxides. Thus, the gel oxide base material of the compositions of this invention may be alumina, silica, magnesia, silica-alumina, silica-magnesia, silica-alumina-magnesia and the like, including naturally occurring hydrous oxide minerals such as clays. In addition, catalyst materials containing these gels alone or in combination with other gels and promoters are contemplated. Thus, for example, those catalyst compositions used in the reforming of petroleum hydrocarbons, or in the desulfurization of such hydrocarbons, or in the isomerization thereof, may be suitable support materials within the contemplation of this invention. Thus, for example, alumina-supported catalyst materials containing group VI and group VIII metal oxides, such as molybdenum oxide, cobalt oxide, nickel oxide, chromium oxide and other known metal oxide promoters in the art are fully contemplated.

In general, these support materials may be prepared in accordance with the procedures well known to those skilled in the art. Thus, for example, the case of aluminum oxide or alumina either as a support material or in combination with other suitable metal oxides, as for example as a promoter, may be prepared in accordance with the processes described in the prior art as, for example, those set forth in U.S. Patent No. 2,701,793 and the like. In addition, processes for preparing alumina, such as are described in U.S. Patent No. 2,258,099, Reissued Patent No. 22,196, U.S. Patents No. 2,404,024, 2,408,724 and British Patent No. 787,755 and No. 735,-390, are but a few of the many examples of catalyst base materials suitable for use within the contemplation of this invention.

The gel oxide-aluminohydride compositions of this invention are prepared by a process comprising reacting under anhydrous conditions a suitable metal oxide gel-containing support which has water chemically bound as hydroxyl groups and which is substantially free from absorbed water, with a metallohydride ion source and thereafter recovering the product.

In accordance with the process aspects of this invention, it is important, for apparent reasons, that metal oxide gel-containing support material be reacted with a metallohydride ion source under substantially anhydrous conditions if reaction with atmospheric or incidental moisture as evidenced by the evolution of hydrogen gas and the formation of metal oxide or oxides is to be avoided.

The hydride content of the final product is, in essence, only limited by the hydroxyl group content of the original metal oxide gel-containing support material. It is clear that each molecule of water removed from a sample of a metal oxide gel, free of physically bound water, must arise from the interdehydration of two hydroxyl groups in or on the gel. Thus, the total amount of such chemically bound water as determined, for example, by weight loss on ignition at an elevated temperature such as 1000° C. leads to the hydroxyl group content. In the case of aluminum oxide gel of the type usually referred to as gamma-alumina, E. B. Cornelius et al., in the "Journal of Physical Chemistry," volume 59, pages 809 to 813 (1959), have shown that a sample of gamma-alumina having a B.E.T. nitrogen surface area of 76 m.²/g. contains 0.6% of its weight as chemically bound water after partial heating at 538° C. in a stream of air at 0.05 mm. water pressure. Our examination of a different sample of gamma-alumina having a surface area in excess of 200 m.²/g. showed that its content of chemically bound water after substantially the same heat pre-treatment accorded to the other alumina sample described above was in substantially the same proportion to its area as for the other sample of alumina.

Whereas this relationship between surface area and hydroxyl group content is essentially correct for gamma-alumina, it does not necessarily follow that other metal oxide gel systems obey either the same relationship or, for that matter, any easily formulated relationship. It is, however, true that, in general, the hydroxyl group content of metal oxide gel systems increases as the surface area increases, and it decreases as the temperature and time of pre-treatment increases. Nevertheless, the hydroxyl group content of other metal oxide gels can be established by measuring the weight loss to constant weight on ignition at, for example, 800° C.

When anhydrous aluminum chloride and lithium aluminohydride are mixed in a suitable solvent as, for example, diethyl ether, in a molar ratio of 1:3, respectively, their reaction may be depicted as follows:

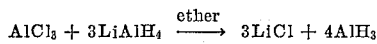

$$AlCl_3 + 3LiAlH_4 \xrightarrow{ether} 3LiCl + 4AlH_3$$

In reality, the molecular formula for aluminum hydride is not known and it would be more correct to denote the hydride as $Al_xH_{3x}$, where $x$ is a member denoting the average number of theoretical $AlH_3$ "monomer" units per molecule.

It is, of course, possible to combine anhydrous aluminum chloride and lithium aluminohydride in molar ratios other than 1:3 and, by so doing, produce, in effect, aluminum hydride containing either some chloride or some lithium, as shown below.

$$Li_yAl_{x-y}H_{3x} \ (y<x)$$

$$Al_xH_{3(x-z)}Cl_{3z} \ (z<x)$$

Further, it is within the scope of our invention to substitute other anhydrous aluminum halides in place of the chloride. All of the aluminum-containing materials thus formed are, as are their hydridic precursors, metallohydride ion sources as hereinbefore defined.

When a metallohydride ion source such as, for example, aluminum hydride is reacted with the hydroxyl group of a metal oxide gel, the reaction may be illustrated variously as:

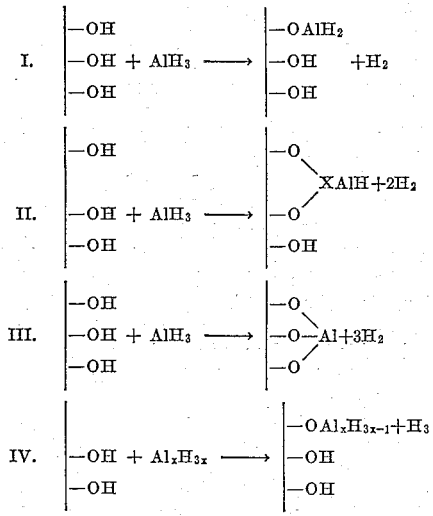

Each scheme is characterized by the relative amounts of hydrogen produced to hydride ion available, which has values as follows:

(I) 1:3    (II) 2:3    (III) 3:3    (IV) 1:3x

The extent to which these or other schemes, not postulated, occur is undoubtedly a function of the solvent used, reagent concentrations, reaction temperature and the like.

When the solid aluminohydride ion source produced in the above reaction is contacted with liquid water, additional reaction takes place which is illustrated variously as shown below:

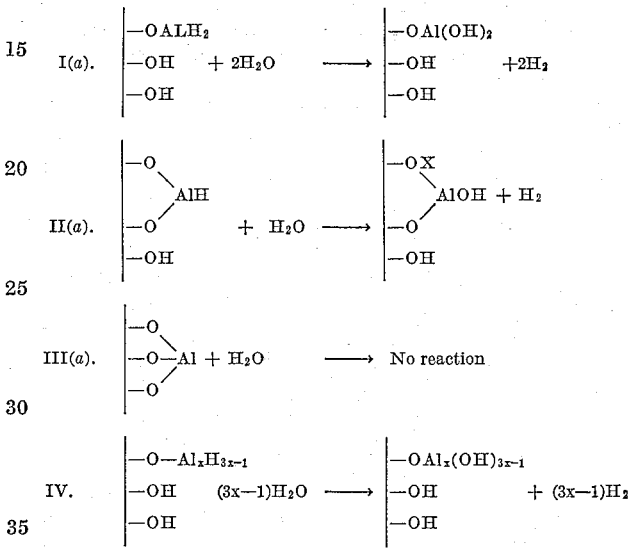

Each of these schemes can be characterized by the relative amounts of hydrogen gas evolved which is in the proportion of $2:1:0:(3x-1)$. As a matter of fact, the relative amounts of hydrogen given off in the reaction to produce the metal oxide-aluminohydride ion source and the subsequent hydrolysis of the metal oxide-hydride ion source can give guidance as to the sort of stoichiometry involved, as above.

Thus, depending upon the hydride content desired in the product, an aluminohydride ion source is reacted with the metal oxide gel-containing support until a part or the whole of the hydroxyl group population of the support is exhausted.

It will be apparent that products having varying hydride ion content will be suited for various purposes. Then the aluminohydride ion source may be reacted with the metal oxide gel-containing support material which contains hydroxyl groups in such amounts as is necessary to prepare products which are suitable for particular purposes.

The temperature at which the reaction is carried out is normally room temperature in that the reaction itself is relatively rapid and the use of heat is for the most part unnecessary. The aluminohydride ion source is normally added as an anhydrous solvent mixture, as for example, an ethyl ether solution of aluminum hydride. Other suitable solvents include, by way of example, benzene, toluene, chloroform and the like.

These gel oxide-aluminohydride ion sources may be in virtually any physical form, as for example, they may be pellets, beads, extrudates, microspheres and in other particular form, as for example, rings, saddles and the like.

In order that the present invention may be more fully understood, the following examples are given primarily by way of illustration. No specific details or enumerations contained therein shall be construed as limitations on the present invention except insofar as they appear in the appended claims. All parts and percentages are by weight unless otherwise specifically designated.

Example 1

Aluminum oxide gel in the form of cylindrical ⅛" x ⅛" pellets is first treated at a temperature of 1100° F. for 60 minutes and subsequently stored over a desiccant to keep the pellets from readsorbing water.

Under anhydrous conditions, 1.90 parts of lithium aluminohydride and 2.22 parts of anhydrous aluminum chloride are reacted in the presence of 100 ml. ether and the resulting mixture is filtered under anhydrous conditions. Caution is warranted in handling this solution to prevent solvent evaporation in that the resulting residue is violently reactive with even traces of moisture. This solution is then contacted with 20.01 parts of the above alumina pellets in ether. The aluminum hydride is partially hydrolyzed by the bound water.

The reaction was substantially completed in 180 minutes, as evidenced by a marked slowing in the evolution of hydrogen gas. The total volume of hydrogen gas evolved amounted to 0.0025 mole per gram of $Al_2O_3$ used.

The treated alumina pellets were then recovered by filtration and copious washings with anhydrous ether in order to remove unreacted aluminum hydride. The liquids were then removed by flushing with dry nitrogen.

Example 2

The alumina-aluminohydride pellets prepared as in Example 1 are allowed to stand in an open container over a 48 hour period and are subsequently treated with water. A vigorous evolution of hydrogen resulted, indicating that a substantial fraction of the aluminohydride function of the product was still not hydrolyzed by moisture from the atmosphere after the 48 hour period. The amount of hydrogen evolved indicated that the hydride ion content was 0.0037 mole hydride ion per gram of material.

Many other metallohydride ion sources, as for example, lithium aluminohydride, will decompose extensively and even explosively when exposed for periods of time considerably less than that of the 48 hour period mentioned above.

The sample of alumina pellets used in Example 1 contained 1.9% by weight of chemically bound water, determined in the manner described hereinbefore, which is equivalent to 3.6% by weight of hydroxyl groups or 0.207 mole of hydroxyl groups per mole of alumina. After reaction with the aluminum hydride, a total volume of hydrogen was collected which was equivalent to 0.245 mole per mole of alumina. From this volume is calculated a ratio of 1.18 moles of hydrogen evolved per mole of hydroxyl groups available. This is close to the ratio resulting from reaction scheme I described above and suggests that, under the conditions of reaction used in Example 1, the stoichiometry is only slightly different from that postulated in scheme I.

When the alumina-aluminohydride pellets are reacted with water, as described in Example 2, a volume of hydrogen is measured which is approximately one and one-half times as great as that observed in the first reaction step. Put in other terms, the molar ratios of hydrogen evolved to hydroxyl groups available were, respectively, 1.2/1 and 1.7/1 and the total hydrogen evolved amounts to a ratio of almost 3/1. This is close to the expected result in view of the fact that the total hydride added to the alumina was approximately in a molar ratio of 3/1 relative to hydroxyl groups.

Example 3

A sample of silica gel, having a surface area of 590 square meters per gram, is calcined at 1100° F. for 60 minutes and stored in a desiccator.

A lithium aluminohydride-anhydrous aluminum chloride reaction product is prepared in exactly the manner described as in Example 1 and the filterable product of the reaction is added to 8.1 parts of the above silica gel in 100 milliliters of anhydrous diethyl ether.

After considerable hydrogen evolution, a solid is removed from the reaction vessel by filtration and washing with additional ether. The desolvated solid product is shown to contain hydridic groups in that the addition of water causes marked further evolution of hydrogen gas.

Example 4

The preparation of Example 3 is repeated in detail except that, in place of the silica gel, 7.7 parts of calcined 13% $Al_2O_3$–87% $SiO_2$ cracking catalyst having 625 square meters per gram surface area is used.

Example 5

A kaolin-type clay, having a surface area of 30 meters per gram is dried and calcined at 1100° F. for 60 minutes. A preparation identical to that described in Example 3 is made with the exception that the silica gel is replaced with 103 parts of the calcined kaolin-type clay.

Example 6

3.0 grams of the catalyst product prepared as in Example 1, and containing approximately 0.002 mole of hydride ion per gram, was placed in a flask and the system was flushed with dry nitrogen. With stirring, 10 milliliters of acetone, 1.36 moles previously dried over Molecular Sieve 5A, was added dropwise over a period of 15 minutes to the above catalyst suspended in 50 ml. of anhydrous ether. The mixture was refluxed for one hour, cooled and filtered. The catalyst was washed with anhydrous ether, flushed with dry nitrogen and then placed in 50 milliliters of cold water. To this was added 100 milliliters of 10% sulfuric acid with stirring. After filtration, the acidic solution was extracted several times with ether. The ether extract contained 0.1 gram of higher boiling materials which, according to an infra-red spectrum, contained approximately 40% of a secondary alcohol. The remaining 60% contained unreacted acetone, mesityl oxide and a doubly conjugated ketone, probably phorone.

Example 6 hereinabove clearly demonstrates that the hydride ion source of this invention is suitable for use as a reducing agent.

As employed herein, the term "metal oxide gel containing aluminohydride groups" is interchangeable with the term "metal oxide gel containing aluminohydride," and the terms "aluminohydride ion source" and "metallohydride ion source" are interchangeable with the terms "aluminohydride" and "metallohydride," respectively.

We claim:
1. A metal oxide gel containing aluminohydride bound to the surface.
2. Plural metal oxide gels containing aluminohydride bound to the surface.
3. Aluminum oxide gel containing aluminohydride bound to the surface.
4. Silicon oxide gel containing aluminohydride bound to the surface.
5. Magnesium oxide gel containing aluminohydride bound to the surface.
6. A process for preparing a metal oxide gel containing aluminohydride which comprises reacting under anhydrous conditions a metal oxide gel, containing chemically bound water as hydroxyl groups which material is substantially free of absorbed water with an aluminohydride obtained by the reaction between an anhydrous aluminum halide and a metallohydride.
7. A process for preparing plural metal oxide gels containing aluminohydride which comprises reacting under anhydrous conditions metal oxide gels containing chemically bound water as hydroxyl groups which material is substantially free of absorbed water with an aluminohydride obtained from the reaction between an anhydrous aluminum halide and lithium aluminohydride.

8. A process for preparing a metal oxide gel selected from the group consisting of aluminum oxide gel, silicon oxide gel, magnesium oxide gel and mixtures thereof containing aluminohydride, which comprises reacting under anhydrous conditions a gel selected from the above group containing chemically bound water as hydroxyl groups which gel is substantially free of absorbed water with an aluminohydride obtained from the reaction between anhydrous aluminum chloride and lithium aluminohydride.

References Cited in the file of this patent

UNITED STATES PATENTS

| | | |
|---|---|---|
| 2,829,981 | Shapiro | Apr. 8, 1958 |
| 2,852,576 | Fotis et al. | Sept. 16, 1958 |
| 2,892,826 | Peters et al. | June 30, 1959 |

OTHER REFERENCES

Gibb: "Hydrides—A Brief Review of Their Nature and Properties," J. of Chem. Ed., October 1948, pages 577–82.

UNITED STATES PATENT OFFICE
CERTIFICATE OF CORRECTION

Patent No. 3,146,209            August 25, 1964

Joseph J. Byrne et al.

It is hereby certified that error appears in the above numbered patent requiring correction and that the said Letters Patent should read as corrected below.

Column 3, equation II, for that portion reading "XAlH+2H$_2$" read -- AlH+2H$_2$ --; same column 3, equation IV should appear as shown below instead of as in the patent:

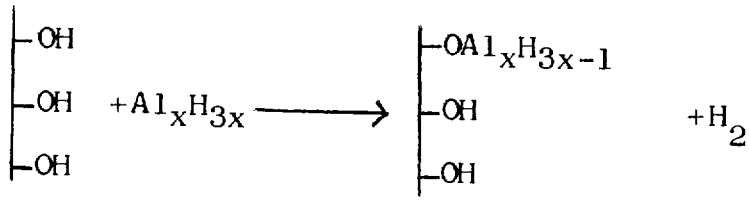

column 4, equation II(a) should appear as shown below instead of as in the patent:

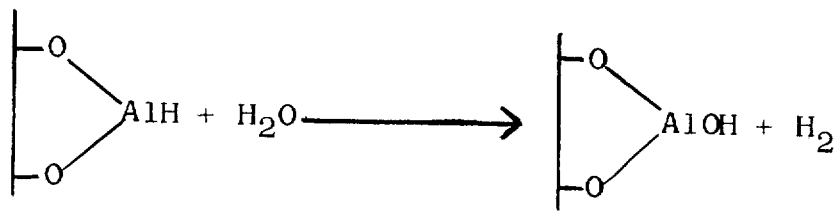

Signed and sealed this 19th day of January 1965.

(SEAL)
Attest:

ERNEST W. SWIDER
Attesting Officer

EDWARD J. BRENNER
Commissioner of Patents